United States Patent
Hwang

(10) Patent No.: US 9,853,482 B2
(45) Date of Patent: Dec. 26, 2017

(54) METHOD AND APPARATUS FOR TRANSMITTING POWER WIRELESSLY

(71) Applicant: HITACHI-LG DATA STORAGE KOREA, INC., Seoul (KR)

(72) Inventor: Hosung Hwang, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 325 days.

(21) Appl. No.: 14/638,524

(22) Filed: Mar. 4, 2015

(65) Prior Publication Data

US 2016/0056637 A1 Feb. 25, 2016

(30) Foreign Application Priority Data

Feb. 26, 2014 (KR) .......................... 10-2014-0022590

(51) Int. Cl.
*H02J 17/00* (2006.01)
*H02J 7/02* (2016.01)
*H02J 50/10* (2016.01)
*H02J 50/12* (2016.01)
*H02J 50/80* (2016.01)

(52) U.S. Cl.
CPC .............. *H02J 7/025* (2013.01); *H02J 17/00* (2013.01); *H02J 50/10* (2016.02); *H02J 50/12* (2016.02); *H02J 50/80* (2016.02)

(58) Field of Classification Search
CPC .. H02J 7/025; H02J 50/80; H02J 50/12; H02J 17/00; H02J 50/10
See application file for complete search history.

(56) References Cited

U.S. PATENT DOCUMENTS

| | | | | |
|---|---|---|---|---|
| 2013/0181539 A1* | 7/2013 | Muratov | ................. | H01F 38/14 307/104 |
| 2013/0300354 A1* | 11/2013 | Ichikawa | ................ | H01F 38/14 320/108 |
| 2014/0103711 A1* | 4/2014 | Ichikawa | ................ | H02J 7/025 307/10.1 |
| 2016/0134131 A1* | 5/2016 | Murayama | .............. | H02J 50/12 307/104 |

OTHER PUBLICATIONS

JP2013-150951 Application.*

* cited by examiner

*Primary Examiner* — Jung Kim
(74) *Attorney, Agent, or Firm* — Birch, Stewart, Kolasch & Birch, LLP

(57) ABSTRACT

Disclosed are a method and an apparatus for transmitting power wirelessly. The apparatus for wirelessly transmitting power includes: a power converter including an inverter for converting DC power into AC power, a resonance circuit, and two sensors for extracting a message transmitted from a receiving apparatus receiving power through magnetic induction of the resonance circuit; and a controller for controlling an operation of the inverter by selectively using messages extracted by the two sensors. When the controller fails in decoding the message extracted by one of the two sensors, the controller decodes the message extracted by the other of the two sensors and controls the operation of the inverter based on the decoded message. One of the two sensors is connected to a front stage of the inverter and the other of the two sensors is connected to a rear stage of the inverter.

5 Claims, 3 Drawing Sheets

METHOD AND APPARATUS FOR TRANSMITTING POWER WIRELESSLY

This application claims the benefit of priority of Korean Patent Application No. 10-2014-0022590 filed on Feb. 26, 2014, which is incorporated by reference in its entirety herein.

BACKGROUND OF THE INVENTION

Field of the Invention

The present invention relates to a method and an apparatus for transmitting power wirelessly.

Discussion of the Related Art

In recent years, with the development of communication and information processing technology, use of smart devices such as a smart phone, and the like has gradually increased and at present, a charging scheme generally applied to the smart devices is a scheme that directly connects an adapter connected to a power supply to the smart device to charge the smart phone by receiving external power or connects the adapter to the smart device through a USB terminal of a host to charge the smart device by receiving USB power.

In recent years, in order to reduce inconvenience that the smart device needs to be directly connected to the adapter or the host through a connection line, a wireless charging scheme that wirelessly charges a battery by using magnetic coupling without an electrical contact has been gradually applied to the smart device.

There are several methods for wirelessly supplying or receiving electric energy and representative methods include an inductive coupling scheme based on an electromagnetic inductive phenomenon and an electromagnetic resonance coupling scheme based on an electromagnetic resonance phenomenon based on a wireless power signal of a specific frequency.

In both schemes, data is transmitted and received by forming a communication channel between a wireless charging apparatus and an electronic apparatus such as the smart device to secure stability in power transmission and increase transmission efficiency and a phenomenon may occur, in which the power transmission is interrupted due to noise generated in the communication channel.

In particular, a process of the electronic apparatus operates while the power is wirelessly transmitted, and as a result, operating power of the electronic apparatus may be changed or electromagnetic waves influence a power transmission/reception circuit, and as a result, an error may occur in data transmission through the communication channel.

SUMMARY OF THE INVENTION

The present invention is contrived to solve the problem and an object of the present invention is to provide a wireless power transmitting apparatus that can secure stability in wireless power transmission.

Another object of the present invention is to provide a method for forming a stable communication channel between a wireless power transmitting apparatus and an electronic apparatus.

Yet another object of the present invention is to provide a wireless power transmitting apparatus that forms a communication channel having little noise.

In accordance with an embodiment of the present invention, an apparatus for wirelessly transmitting power includes: a power converter including an inverter for converting DC power into AC power, a resonance circuit, and two sensors for extracting a message transmitted from a receiving apparatus receiving power through magnetic induction of the resonance circuit; and a controller for controlling an operation of the inverter by selectively using messages extracted by the two sensors.

When the controller fails in decoding the message extracted by one of the two sensors, the controller may decode the message extracted by the other of the two sensors and control the operation of the inverter.

The message may include an average value of power received by the receiving apparatus or include an error from power which the receiving apparatus intends to receive.

One of the two sensors may be connected to a front stage of the inverter and the other one of the two sensors may be connected to a rear stage of the inverter.

The two sensors may be a current sensor or a voltage sensor.

One of the two sensors may be a current sensor and the other may be a voltage sensor.

In accordance with another embodiment of the present invention, a method for wirelessly transmitting power includes: extracting messages transmitted from a receiving apparatus receiving power through magnetic induction at two locations in a power converter; decoding the extracted messages; and controlling, when decoding the message extracted at one of the two locations is unsuccessful, an inverter converting DC power into AC power based on the message extracted and decoded at the other of the two locations.

Accordingly, power can be stably transmitted to an electronic apparatus wirelessly regardless of a state of the electronic apparatus.

Further, a phenomenon in which wireless power transmission is interrupted is lessened to provide satisfaction to a consumer.

DETAILED DESCRIPTION OF THE EMBODIMENTS

Hereinafter, embodiments of an apparatus and a method for wireless transmitting power according to the present invention will be described in detail with reference to the accompanying drawings.

Figure 1:
FIG. 1 conceptually illustrates wirelessly transmitting power to an electronic apparatus from a wireless power transmitting apparatus.

FIG. 1 conceptually illustrates wirelessly transmitting power to an electronic apparatus from a wireless power transmitting apparatus.

A wireless power transmitting apparatus 100 may be a power transferring apparatus that wirelessly transfers power required by an electronic apparatus 200 or a wireless charging apparatus for charging a battery of the electronic apparatus 200 by wirelessly transferring power or may be implemented by various types of apparatuses that transfer power to the electronic apparatus 200 requiring power in a non-contact state.

The electronic apparatus 200 as an apparatus which is operable by wirelessly receiving power from the wireless power transmitting apparatus 100 may charge the battery by using the power received wirelessly. The electronic apparatus that wirelessly receives the power may include all portable electronic apparatuses, for example, input/output apparatuses such as a smart phone or a smart device, a tablet computer, a multimedia terminal, a keyboard, a mouse, a video or audio auxiliary apparatus, and the like.

In the wireless power transmitting apparatus 100 according to the present invention, according to an inductive coupling scheme based on an electromagnetic inductive phenomenon by a wireless power signal, that is, resonance is generated in the electronic apparatus 200 by the wireless power signal transmitted by the wireless power transmitting apparatus 100 and power may be wirelessly transferred without a contact with the electronic apparatus 200 from the wireless power transmitting apparatus 100 by a resonance phenomenon and a magnetic field is changed by AC current in a primary coil by the electromagnetic inductive phenomenon and current is induced to a secondary coil to transfer the power.

When an intensity of current that flows on the primary coil of the wireless power transmitting apparatus 100 is changed, a magnetic field that passes through the primary coil or a transmission (Tx) coil is changed by the current and the changed magnetic field generates induced electromotive force to the secondary coil or reception (Rx) coil in the electronic apparatus 200.

When the wireless power transmitting apparatus 100 and the electronic apparatus 200 are placed so that the transmission coil at the wireless power transmitting apparatus 100 side and the reception coil at the electronic apparatus 200 side come close to each other and the wireless power transmitting apparatus 100 controls current of the transmission coil to be changed, the electronic apparatus 200 supplies power to a load such as a battery by using the electromotive force induced to the reception coil.

Since efficiency of the wireless power transferring by the inductive coupling scheme is influenced by a layout and a distance between the wireless power transmitting apparatus 100 and the electronic apparatus 200, the wireless power transmitting apparatus 100 is configured to include a flat interface surface and the transmission coil may be mounted on the bottom of the interface surface and one or more electronic apparatuses may be laid on the top of the interface surface. A space between the transmission coil mounted under the interface surface and the reception coil positioned on the top of the interface surface is made to be sufficiently small to increase the efficiency of the wireless power transferring by the inductive coupling scheme.

A mark indicating a location at which the electronic apparatus will be laid may be displayed on the top of the interface surface and the mark may indicate a location of the electronic apparatus, which makes an array between the transmission coil mounted on the bottom of the interface surface and the reception coil be appropriately achieved. A protrusion type structure for guiding the location of the electronic apparatus may be formed on the top of the interface surface and a magnetic body such as a magnet is formed on the bottom of the interface surface to guide the transmission coil and the reception coil to be normally arrayed by attraction with a magnetic body having a different pole, which is provided in the electronic apparatus.

Figure 2:
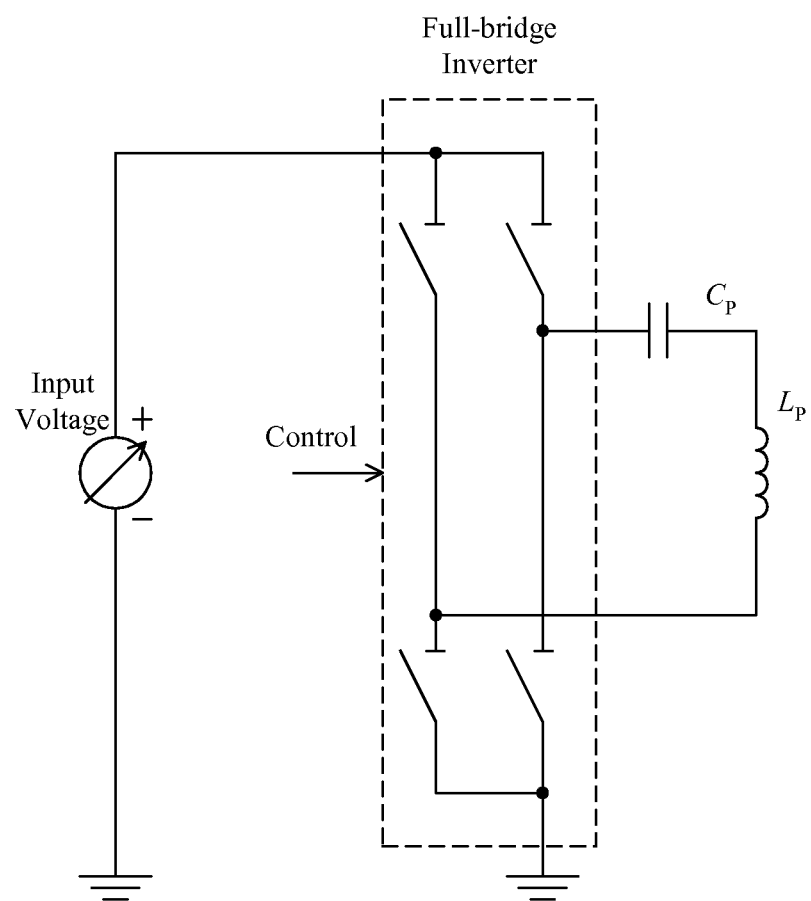
FIG. 2 conceptually illustrates a circuit configuration of a power converter of a transmitting apparatus for wirelessly transmitting power in an electromagnetic inductive scheme.

FIG. 2 conceptually illustrates a circuit configuration of a power converter of a transmitting apparatus for wirelessly transmitting power in an electromagnetic inductive scheme.

The wireless power transmitting apparatus may be configured to generally include a power supply and a power converter constituted by an inverter, and a resonance circuit, and the power supply may be a voltage source or a current source and the power converter converts power supplied from the power supply into the wireless power signal and transfers the wireless power signal to the receiving apparatus. And, the wireless power signal is formed in a magnetic field or an electromagnetic field type having a resonance characteristic and includes a coil that generates the wireless power signal.

The inverter converts a DC input into an AC waveform having desired voltage and a desired frequency through a switching element and a control circuit. In FIG. 2, a full-bridge inverter is illustrated and other types of inverters including a half-bridge inverter, and the like are available.

The resonance circuit is configured to include a primary coil Lp and a capacitor Cp that will transmit power by a magnetic induction scheme and the coil and the capacitor decide a primary resonance frequency of power transmission. The primary coil forms the magnetic field corresponding to the wireless power signal with a change of current and may be implemented in a disk spiral shape or a cylindrical solenoid shape.

The AC current converted by the inverter drives the resonance circuit, and as a result, the magnetic field is formed at the primary coil. The inverter generates AC having a frequency close to a resonant frequency of the resonance circuit to increase transmission efficiency of the transmitting apparatus and the inverter is controlled to change transmission efficiency of the transmitting apparatus.

Figure 3:
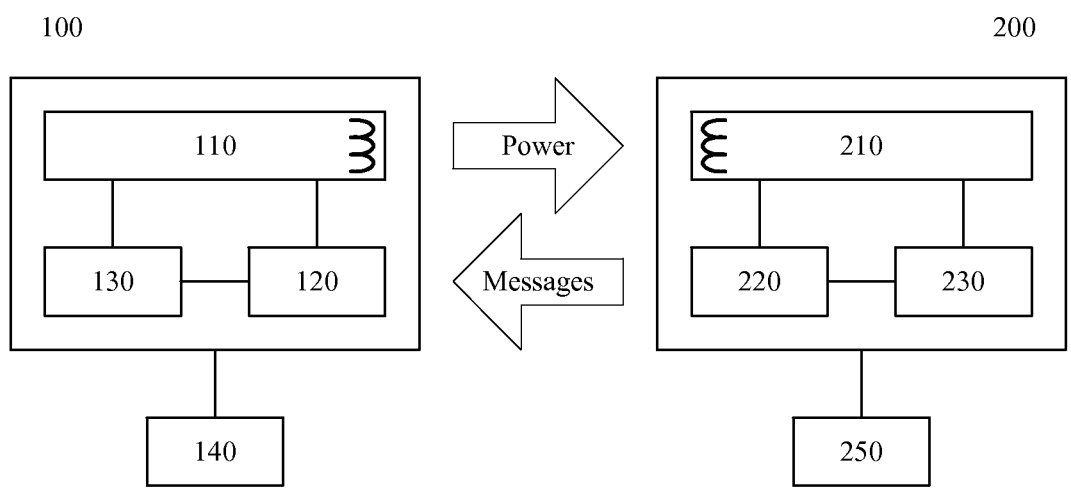
FIG. 3 illustrates a configuration for the wireless power transmitting apparatus and a wireless power receiving apparatus to transmit and receive power and a message.

FIG. 3 illustrates a configuration for the wireless power transmitting apparatus and a wireless power receiving apparatus to transmit and receive power and a message.

Since the power converter illustrated in FIG. 2 just transmits the power unilaterally regardless of a reception state of the receiving apparatus, a configuration for receiving a feed-back associated with the reception state from the receiving apparatus is required in the wireless power transmitting apparatus in order to transmit the power to fit the state of the receiving apparatus.

The wireless power transmitting apparatus 100 may be configured to include a power converter 110, a communication unit 120, a controller 130, and a power supply unit 140, the wireless power receiving apparatus 200 may be configured to include a power receiver 210, a communication unit 220, and a controller 230 and configured to further include a load 250 to which the received power is to be supplied.

The power converter 110 may be constituted by the inverter and the resonance circuit of FIG. 2, and configured to further include a circuit that may control characteristics such as a frequency, a voltage, a current, and the like used for forming the wireless power signal.

The communication unit 120 is connected to the power converter 110 demodulates the wireless power signal modulated by the receiving apparatus 200 that wirelessly receives the power from the transmitting apparatus 100 by the magnetic induction scheme to detect a power control message.

The controller 130 decides at least one characteristic of the operating frequency, voltage, and current of the power converter 110 and controls the power converter 110 based on the message detected by the communication unit 120 to allow the power converter 110 to generate the wireless power signal suitable for the message. The communication unit 120 and the controller 130 may be configured as one module.

The power receiver 210 may include a matching circuit constituted by a capacity and a secondary coil through which the induced electromotive force is generated with the change of the magnetic field generated in the primary coil and includes a rectifier circuit that rectifies the AC current that flows on the secondary coil to output DC current.

The communication unit 220 of the receiving apparatus is connected to the power receiver 210 and changes the wireless power signal between the transmitting apparatus and the receiving apparatus by adjusting a load of the power receiver by a scheme that changes a resistance load in DC and/or a capacitive load in AC to transfer the power control message to the transmitting apparatus.

The controller 230 of the receiving apparatus controls each component included in the receiving apparatus, measures an output of the power receiver 110 in a current or voltage form and controls the communication unit 220 based on the measured output to transfer the power control message to the wireless power transmitting apparatus 100. The message may instruct the wireless power transmitting apparatus 100 to start or end transferring the wireless power signal and further, control a characteristic of the wireless power signal.

The wireless power signal formed by the power converter 110 of the transmitting apparatus is received by the power receiver 210, the controller 230 controls the communication unit 220 to modulate the wireless power signal, and the controller 230 changes a reactance of the communication unit 220 to perform a modulation process that changes a wattage received from the wireless power signal. When the wattage received from the wireless power signal is changed, the current and/or voltage of the power converter 110 which forms the wireless power signal is also changed and the communication unit 120 of the wireless power transmitting apparatus 100 may perform a demodulation process by sensing the change in current and/or voltage of the power converter 110.

The controller 230 of the wireless power receiving apparatus 200 generates a packet including a message to be transferred to the wireless power transmitting apparatus 100 and modulates the wireless power signal to include the packet, and the controller 130 of the wireless power transmitting apparatus 100 may acquire the power control message by decoding a packet extracted through the communication unit 120. The controller 230 of the wireless power receiving apparatus 200 transmits a message for requesting the change in characteristic of the wireless power signal based on the wattage received through the power receiver 210 in order to control the received power.

Figure 4:
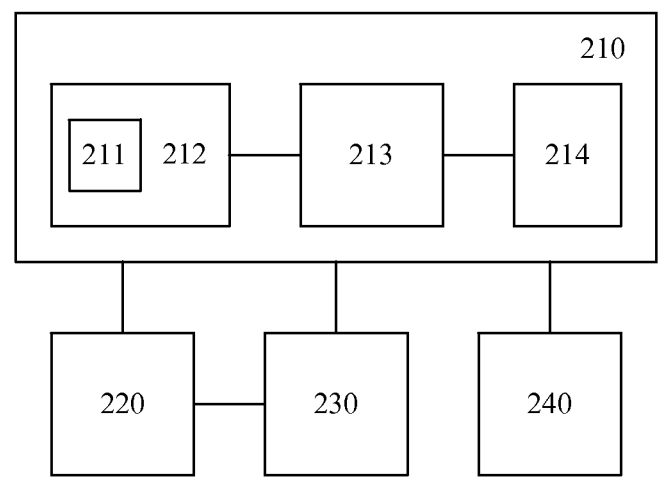
FIG. 4 illustrates a configuration of the wireless power receiving apparatus.

FIG. 4 illustrates a configuration of the wireless power receiving apparatus in detail and the wireless power receiving apparatus 200 may be configured to include the power receiver 210, the communication unit 220, the controller 230, and a charger 240.

The power receiver 210 may be configured to include a matching circuit 212 including a capacitor and a secondary coil 211 for receiving a wireless power signal transferred in the form of an electromagnetic field that resonates, a rectifier circuit 213 for converting a power signal received in an AC form while resonating into DC, and a sensor 214 for detecting a wattage of the power signal by measuring a current value or a voltage value of the power signal converted into the DC, and may further include a circuit that prevents overvoltage or overcurrent from being generated by the received power signal.

The controller 230 may generate a message for controlling the characteristic of the wireless power signal based on the wattage detected by the sensor 214 and transmit the message to the wireless power transmitting apparatus 100 by controlling the communication unit 220. Further, the controller 230 may generate a message for requesting a start or an end of transmitting the wireless power and transmit the generated message to the wireless power transmitting apparatus 100.

The electronic apparatus including the wireless power receiving apparatus 200, for example, a wirelessly chargeable smart device may operate by receiving the power transferred from the wireless power transmitting apparatus 100 or operate by charging a battery through the charger 240 by using the transferred power and using the power charged in the battery. The controller 230 may control the charger 240 to charge the battery by using the power received through the power receiver 210.

The electronic apparatus including the wireless power receiving apparatus 200 may transmit and receive data to and from other apparatus through a short-range communication module such as WiFi, performs a call or data transmission and reception through a communication module according to a mobile communication agreement such as CDMA or LTE, execute an application through a processor, or reproduce audio or video contents, and when the electronic apparatus performs the communication or multimedia reproducing operation, the electronic apparatus drives the communication module or processor to electromagnetically influence the wireless power transmission and reception.

The wireless power receiving apparatus 200 transfers a communication packet to the wireless power transmitting apparatus 100 by modulating a resonance waveform inductively coupled with the wireless power transmitting apparatus 100 through a scheme that changes an impedance (load or reactance) and when the wireless power transmitting apparatus 100 detects the change in resonance waveform in the resonance circuit and extracts the packet therefrom, a lot of noise occurs due to the electromagnetic influence caused by the operation of the electronic apparatus including the wireless power receiving apparatus 200, and as a result, signal quality of the resonance waveform may be deteriorated and the packet extraction may be unsuccessful or decoding the extracted packet may be unsuccessful.

When the wireless power transmitting apparatus 100 extracts the packet transmitted by the receiving apparatus 200, the packet is extracted only in the resonance circuit constituted by the coil and the capacitor, that is, only through one channel. Since the resonance circuit is inductively coupled with the receiving apparatus 200, the resonance circuit is easily and directly influenced by the state of the receiving apparatus 200 and there is no choice of another channel even though the quality of the resonance waveform deteriorates.

As described above, since the state of the resonance waveform modulated by the wireless power receiving apparatus 200 is bad due to the noise, the packet may not be decoded, which may cause phenomena including power instability of the wireless power receiving apparatus 200, wireless power transmission interruption, and the like.

In the present invention, by considering that the influences due to the noise are different from each other at a front part and a rear part of the resonance circuit constituted by the coil and the capacitor, the packets are extracted from a modulation form of the resonance waveform at different locations in the wireless power transmitting apparatus 100, that is, the packets are extracted by forming two communication channels for extracting the packets and selecting a communication channel less influenced by the noise to stably extract the packet transmitted by the inductively coupled wireless power receiving apparatus 200.

Figure 5:
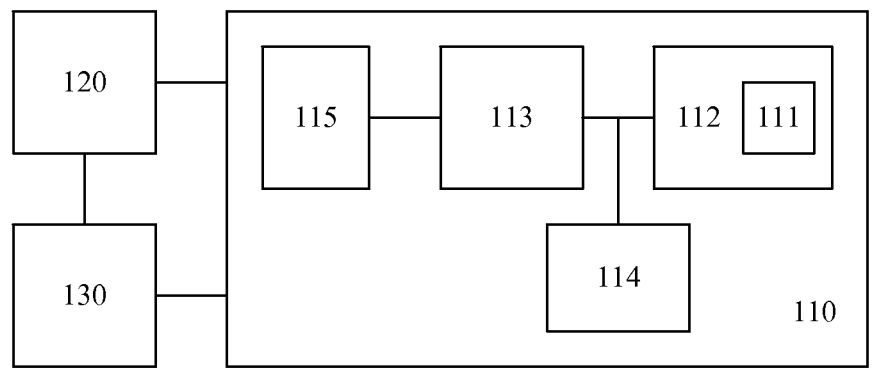
FIG. 5 illustrates a configuration of a wireless power transmitting apparatus according to an embodiment of the present invention.

FIG. 5 illustrates a configuration of the wireless power transmitting apparatus according to an embodiment of the present invention.

The power converter 110 according to the embodiment of the present invention may be configured to include a resonance circuit 112 including a primary coil 111 and one or more capacitors, an inverter 113 for converting DC power into an AC waveform, a first sensor 114 connected to a rear stage of the inverter 113 to detect AC current or voltage, and a second sensor 115 connected to a front stage of the inverter 113 to detect current or voltage of the DC power.

In FIG. 5, it is illustrated that the first sensor 114 is positioned at the rear stage of the inverter 113, that is, between the resonance circuit 112 and the inverter 113 and the present invention is not limited thereto. The first sensor 114 may be placed at a rear stage of the resonance circuit 112 or between the primary coil 111 and the capacitor in the resonance circuit 112.

Both of the first sensor 114 and the second sensor 115 may be a current sensor for measuring the current or a voltage sensor for measuring the voltage. Or one of both sensors is the current sensor, and the other one may be the voltage sensor. Further, the first sensor 114 and the second sensor 115 may extract the packet transmitted by the wireless power receiving apparatus 200 from a change in amplitude (alternatively, envelope) loaded on a waveform of the current or voltage measured as time elapses.

The communication unit 120 decodes a packet extracted from one or two communication channels of the first sensor 114 and the second sensor 115 to acquire a message included in the packet.

The controller 130 controls the power converter 110 based on the message acquired by the communication unit 120 and may perform electromagnetic inductive coupling between the primary coil 111 of the transmitting apparatus and the secondary coil 211 of the receiving apparatus, power transmission operation, and a power transmission controlling operation.

An interaction between the wireless power transmitting apparatus 100 and the wireless power receiving apparatus 200 is constituted by four steps of selection, ping, identification and configuration, and power transfer. The selection step is a step for the transmitting apparatus to discover a target laid on the interface surface, the ping step is a step for verifying whether the target includes the receiving apparatus, the identification and configuration step as a preparatory step for transmitting the power to the receiving apparatus is a step for receiving appropriate information from the receiving apparatus and making a power transfer contract with the receiving apparatus, and the power transfer step is a step for actually transmitting the power to the receiving apparatus wirelessly by the interaction between the transmitting apparatus and the receiving apparatus.

In the ping step, the receiving apparatus 200 transmits a signal strength packet (SSP) indicating an inductive coupling degree of the primary coil and the secondary coil to the transmitting apparatus 100 through modulation of the resonance waveform.

In the identification/configuration step, the receiving apparatus 200 transmits to the transmitting apparatus 100 an identification packet including a version, a make code, apparatus identification information, and the like of the receiving apparatus 200, a configuration packet including information including maximum power, a power transferring method, and the like of the receiving apparatus 200, and the like.

In the power transfer step, the receiving apparatus 200 transmits to the transmitting apparatus 100 a control error packet (CEP) indicating a difference between an operating point where the receiving apparatus 200 receives the power signal and an operating point determined in the power transfer contract, a received power packet (RPP) indicating an average value of the power which the receiving apparatus 200 receives through the interface surface, and the like.

Each of the first sensor 114 and the second sensor 115 may extract the packet from the change in resonance waveform, the communication unit 120 decodes the packet by selecting one communication channel of the first sensor 114 and the second sensor 115 to acquire the message, and the controller 130 may transmit the power wirelessly while changing the power transfer characteristic according to a request by the receiving apparatus 200 by controlling the power converter 110 based on the message which the communication unit 120 acquires by decoding the packet extracted from the corresponding communication channel.

In the power transfer step, when the communication unit 120 fails in decoding the packet extracted in one communication channel, for example, when the communication unit 120 fails in decoding the packet extracted by the first sensor 114, the communication unit 120 decodes the packet extracted by the other communication channel, that is, the second sensor 115 to acquire the message included in the packet and the controller 130 controls the power converter 110 based on the message to change the power transfer characteristic of the current or voltage that flows on the primary coil.

Figure 6:
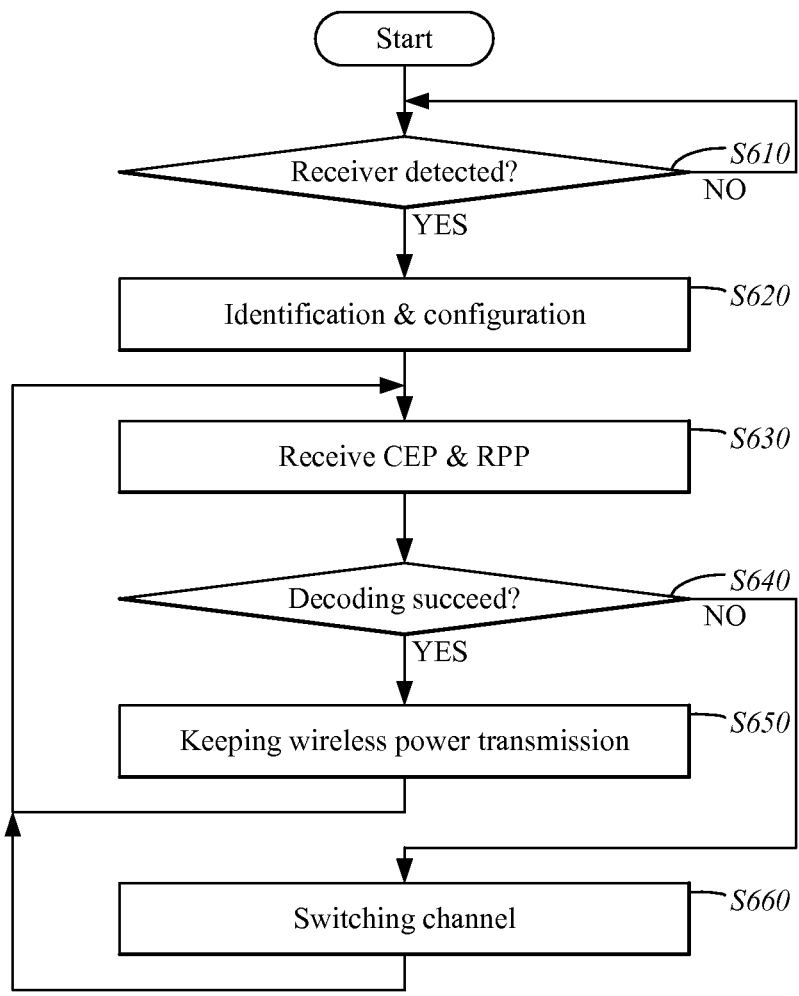
FIG. 6 is an operating flowchart regarding a method in which a wireless power transmitting apparatus receives data from a power receiving apparatus while switching a communication channel and wireless transmits power based thereon according to another embodiment of the present invention.

FIG. 6 is an operating flowchart regarding a method in which a wireless power transmitting apparatus receives data from a power receiving apparatus while switching a communication channel and wireless transmits power based thereon according to another embodiment of the present invention.

The controller 130 of the wireless power transmitting apparatus 100 makes the magnetic field be changed in the primary coil 111 by controlling the power converter 110 to generate the wireless power signal and verifies whether the wireless power signal is changed due to the wireless power receiving apparatus 200. For example, when the voltage or current detected from the first sensor 114 is changed with time, the controller 130 may determine that the wireless power receiving apparatus 200 is positioned on the interface surface for wireless power reception (S610). Step S610 corresponds to the selection and ping steps.

When the controller 130 determines that the wireless power receiving apparatus 200 prepares for the inductive coupling based on the electromagnetic induction phenomenon (YES in step S610), the controller 130 performs the identification and configuration step through the interaction with the wireless power receiving apparatus 200 (S620). When the resonance waveform is transmitted by controlling the power converter 110 and the receiving apparatus 200 transmits the identification packet including the version, the make code, the apparatus identifier, and the like of the receiving apparatus and the configuration packet including the maximum power, the power transferring method, and the like of the receiving apparatus, for example, the first sensor 114 may extract the packet from the change in resonance waveform, the communication unit 120 decodes the extracted packet to acquire the message included in the packet, and the controller 130 may control the characteristics such as a resonance frequency, the intensity of the current that flows on the primary coil 111, the magnitude of the voltage, and the like so as to increase efficiency of the inductive coupling with the receiving apparatus 200 by controlling the power converter 110 based on the message.

Thereafter, in the power transfer step of wirelessly transferring the power, while the wireless power signal is transmitted from the transmitting apparatus 100 to the receiving apparatus 200, the receiving apparatus 200 transmits to the transmitting apparatus 100 a packet including an error corresponding to a difference between a desired operating point and an operating point determined in the identification and configuration step by modulating the load of the power receiver that receives the wireless power signal and for example, the first sensor 114 extracts the packet transmitted by the receiving apparatus 200 based on the change in resonance waveform (S630).

The communication unit 120 verifies the message which the receiving apparatus 200 transmits by decoding the extracted packet (S640). When decoding the extracted packet is successful (YES in S640), the controller 130 reflects contents requested by the receiving apparatus 200 by controlling the power converter 110 according to the message acquired through the decoding to continue transmitting the wireless power signal (S650).

However, when the communication unit 120 fails in decoding the extracted packet (NO in S640), since the contents requested by the receiving apparatus 200 may not be determined, the communication channel that extracts the packet transmitted by the receiving apparatus 200 is switched from the first sensor 114 to the second sensor 115 (S660), and as a result, for example, the second sensor 115 receives the packet transmitted by the receiving apparatus 20 based on the change in resonance waveform and extracts the packet (S630).

The communication unit 120 acquires the message transmitted by the receiving apparatus 20 by decoding the packet extracted from the second sensor 115 which is the switched communication channel and the controller 130 continues the wireless power transmitting operation by controlling the wireless power signal according to the message which the communication units acquires through the decoding (S640).

The present invention is not limited to the embodiments, and it would be apparent to those skilled in the art that various changes and modifications might be made to these embodiments without departing from the spirit and the scope of the invention. Accordingly, it should be appreciated that the changed example or modified examples belong to the appended claims of the present invention.

What is claimed is:

1. An apparatus for wirelessly transmitting power, the apparatus comprising:
    a power converter including an inverter for converting DC power into AC power, a resonance circuit, and two sensors for extracting a message transmitted from a receiving apparatus receiving power through magnetic induction of the resonance circuit; and
    a controller for controlling an operation of the inverter by selectively using messages extracted by the two sensors,
    wherein one of the two sensors is connected to a front stage of the inverter and the other of the two sensors is connected to a rear stage of the inverter.

2. The apparatus gear train of claim 1, wherein when the controller fails in decoding the message extracted by one of the two sensors, the controller decodes the message extracted by the other of the two sensors and controls the operation of the inverter based on the decoded message.

3. The apparatus of claim 1, wherein the message includes an average value of power received by the receiving apparatus or includes an error from power which the receiving apparatus intends to receive.

4. The apparatus of claim 1, wherein the two sensors are a current sensor or a voltage sensor.

5. The apparatus of claim 1, wherein one of the two sensors is a current sensor and the other of the two sensors is a voltage sensor.

* * * * *